(12) United States Patent
Mueller et al.

(10) Patent No.: US 11,279,206 B1
(45) Date of Patent: Mar. 22, 2022

(54) HEATING VENTILATION AND AIR CONDITIONING (HVAC) SYSTEM WITH ZONAL CONTROL

(71) Applicant: Zoox, Inc., Foster City, CA (US)

(72) Inventors: Paul Raymond Mueller, Hayward, CA (US); Jaime Andres Ocampo Villegas, Foster City, CA (US); Goutham Shanmuga Sundaram, Foster City, CA (US); Rahul Subramanian, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 327 days.

(21) Appl. No.: 16/017,424

(22) Filed: Jun. 25, 2018

(51) Int. Cl.
*B60H 1/24* (2006.01)
*B60H 1/00* (2006.01)

(52) U.S. Cl.
CPC ......... *B60H 1/241* (2013.01); *B60H 1/00371* (2013.01); *B60H 1/00564* (2013.01); *B60H 1/00742* (2013.01)

(58) Field of Classification Search
CPC ............... B60H 1/241; B60H 1/00371; B60H 1/00564; B60H 1/00742; B60H 1/00385; B60H 1/00028; B60H 2001/002; B60H 2001/00242
USPC ....................................................... 165/203
See application file for complete search history.

(56) References Cited

U.S. PATENT DOCUMENTS

| | | | | |
|---|---|---|---|---|
| 4,376,408 A | * | 3/1983 | Iijima | B60H 1/00207 454/140 |
| 5,878,809 A | * | 3/1999 | Heinle | B60H 1/00742 165/203 |
| 6,059,018 A | * | 5/2000 | Yoshinori | B60H 1/00285 165/41 |
| 6,152,217 A | * | 11/2000 | Ito | B60H 1/00064 165/202 |
| 6,266,967 B1 | * | 7/2001 | Honda | B60H 1/3205 62/193 |
| 6,598,665 B2 | * | 7/2003 | Schwarz | B60H 1/00064 165/203 |
| 6,655,163 B1 | * | 12/2003 | Scherer | B60H 1/00007 165/203 |
| 6,758,054 B2 | * | 7/2004 | Zheng | B60H 1/3214 62/199 |

(Continued)

FOREIGN PATENT DOCUMENTS

JP 01114510 A * 5/1989 ......... B60H 1/00371

*Primary Examiner* — Tho V Duong
*Assistant Examiner* — Raheena R Malik
(74) *Attorney, Agent, or Firm* — Lee & Hayes, P.C.

(57) ABSTRACT

A heating ventilation and air conditioning (HVAC) system may effectively provide and/or substantially maintain adjacent thermal zones that have different temperatures and/or humidities from one another. The HVAC system may include a duct network including zonal ducts each having a zonal duct exit configured to create aerodynamic profiles that result in a thermal zone. A thermal zone may be characterized by a volume having a temperature and/or humidity which may differ from an adjacent thermal zone, such that a temperature and/or humidity gradient exists at a thermal zone boundary between adjacent thermal zones, and such that diffusion of the temperature and/or humidity between the adjacent thermal zones is aerodynamically inhibited, or otherwise minimized.

21 Claims, 7 Drawing Sheets

(56) References Cited

U.S. PATENT DOCUMENTS

| | | | | |
|---|---|---|---|---|
| 6,872,135 B2* | 3/2005 | Currie | B60H 1/00842 | 454/139 |
| 6,978,634 B2* | 12/2005 | Aoki | B60H 1/247 | 165/205 |
| 6,983,793 B2* | 1/2006 | Zheng | B60H 1/00885 | 165/203 |
| 7,159,651 B2* | 1/2007 | Ito | B60H 1/00007 | 165/202 |
| 7,520,554 B2* | 4/2009 | Brown | B60N 2/305 | 296/65.01 |
| 7,587,901 B2* | 9/2009 | Petrovski | B60H 1/2218 | 62/3.3 |
| 7,877,827 B2* | 2/2011 | Marquette | F24H 9/2071 | 5/423 |
| 7,931,209 B2* | 4/2011 | Mola | B60H 1/00742 | 236/44 C |
| 8,336,609 B2* | 12/2012 | Schwan | B64D 13/00 | 165/203 |
| 8,381,540 B2* | 2/2013 | Alston | F25D 23/006 | 62/236 |
| 9,227,482 B2* | 1/2016 | DiGasbarro | B60H 1/00028 | |
| 2004/0185766 A1* | 9/2004 | Hayashi | B60H 1/0055 | 454/156 |
| 2005/0067158 A1* | 3/2005 | Ito | B60H 1/00885 | 165/204 |
| 2005/0138941 A1* | 6/2005 | Kikuchi | B60H 1/00278 | 62/178 |
| 2006/0273646 A1* | 12/2006 | Comiskey | B60N 2/5628 | 297/408 |
| 2007/0234742 A1* | 10/2007 | Aoki | B60N 2/5657 | 62/3.3 |
| 2008/0085672 A1* | 4/2008 | Creed | F25B 27/00 | 454/69 |
| 2010/0274396 A1* | 10/2010 | Yang | B60H 1/00478 | 700/278 |
| 2010/0314071 A1* | 12/2010 | Lee | B60H 1/00285 | 165/59 |
| 2013/0232996 A1* | 9/2013 | Goenka | B60N 2/56 | 62/3.61 |
| 2014/0179212 A1* | 6/2014 | Space | B60N 2/5657 | 454/76 |
| 2016/0207376 A1* | 7/2016 | Sawyer | B60H 1/3227 | |
| 2016/0250956 A1* | 9/2016 | Seiting | B60N 2/5657 | 297/180.14 |
| 2016/0304013 A1* | 10/2016 | Wolas | B60N 2/5657 | |
| 2017/0181225 A1* | 6/2017 | Inaba | H05B 3/12 | |
| 2017/0267140 A1* | 9/2017 | Lofy | B60N 2/56 | |
| 2018/0170143 A1* | 6/2018 | Yun | B60H 1/00964 | |
| 2019/0143784 A1* | 5/2019 | Mazzocco | B60N 2/5678 | 165/203 |

* cited by examiner

HEATING VENTILATION AND AIR CONDITIONING (HVAC) SYSTEM WITH ZONAL CONTROL

BACKGROUND

Heating ventilation and air conditioning (HVAC) systems are used to control the temperature and/or humidity of a given area. HVAC systems may typically include an HVAC unit including a heating component, a cooling component, and/or a dehumidification component, a duct coupled to the HVAC unit, and a fan for circulating air conditioned by the HVAC unit through an area for which the temperature and humidity are being controlled. However, it is difficult to maintain different temperatures or humidities between areas having minimal or no physical partitions separating one another. This may result in possible drawbacks, for example, when the area is occupied by more than one person, and two of the people in the area are comfortable at different temperature or humidity levels. For example, one person may be comfortable at a higher temperature than the other person. This situation may often occur in an open area such an interior of a room or space substantially devoid of physical partitions that might enable different temperature or humidity levels to be maintained in areas defined by the partitions. For example, a vehicle cabin may be designed to be occupied by more than one person, but may also be substantially devoid of any physical partitions, except for the seats and/or seatbacks. Thus, it may be difficult to accommodate different temperature and/or humidity preferences for different people in the vehicle cabin due in part to the lack of physical partitions separating the different people from one another.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
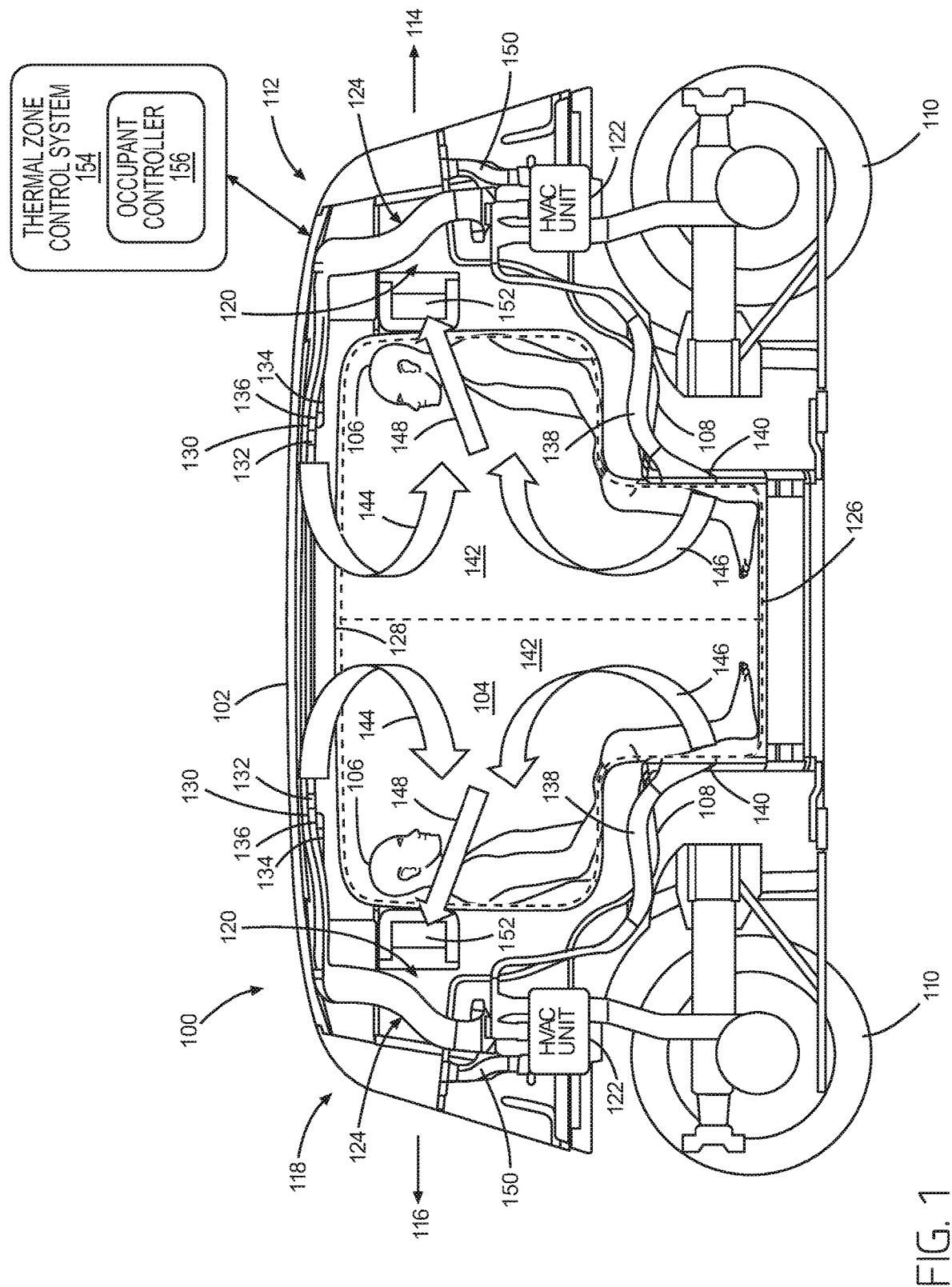
FIG. 1 is a cutaway side view of an example vehicle including an example HVAC system.

This disclosure is generally directed to a system (e.g., an HVAC system), including particular systems and subsystems therein (e.g., ducting) for optimizing thermal control for multiple regions of an undivided area. For example, a vehicle may include a cabin for multiple passengers, and the cabin may not include physical partitions between the passengers or separating portions of the cabin volume associated with each of the passengers from one another, except for the seats and/or seatbacks. In such cabins, it is difficult for each of the passengers to effectively control the temperature or humidity of the cabin volume in which they are present according to their respective preferences, without impacting other passengers. Although the temperature or humidity in the entire cabin volume may be effectively controlled, it is difficult to control the temperature or humidity in any particular portion of the cabin volume associated with a particular person due to the lack of physical partitions separating the different portions of the cabin volume from one another. Due to the lack of physical partitions, any differences in temperature or humidity between adjacent portions of the cabin volume quickly diffuse. The disclosed system, in at least some examples, may effectively provide and/or substantially maintain adjacent thermal zones that have different temperatures, thermal fluxes (e.g., an amount of heat passing to or from a particular zone), and/or humidities from one another. In some examples, the system includes a duct network including zonal ducts, each having a zonal duct exit configured to create aerodynamic profiles (e.g., vortices) that result in a thermal zone. In some examples, a thermal zone may be characterized by a volume having a temperature and/or humidity capable of differing from an adjacent thermal zone, such that a temperature and/or humidity gradient may exist at a thermal zone boundary between adjacent thermal zones, and such that diffusion of the temperature and/or humidity between the adjacent thermal zones is aerodynamically inhibited, or otherwise minimized. In some examples, the thermal zone boundary may take the form of a two-dimensional or three-dimensional surface. As a result, some examples of the system may be effective in providing two (or more) adjacent passengers in a vehicle cabin with the ability to control the temperature and/or humidity of the cabin volume portion which they occupy independently of one another.

This disclosure is generally directed to a system (e.g., an HVAC system). The system may include an air source (e.g., an HVAC unit) configured to alter one or more of temperature or humidity, and a duct network coupled to the air source and configured to provide flow communication between the air source and a cabin volume. The duct network may include a first zonal duct including a first zonal duct exit configured to create first aerodynamic profiles (e.g., vortices) resulting in a first thermal zone at a first position (e.g., a first seating position) in the cabin volume and having a first temperature and a first humidity. The duct network may further include a second zonal duct including a second zonal duct exit configured to create second aerodynamic profiles (e.g., vortices) resulting in a second thermal zone at a second position (e.g., a second seating position) in the cabin volume and having a second temperature and a second humidity. In some examples, the first temperature differs from the second temperature and/or the first humidity differs from the second humidity. In some examples, the first and second thermal zones are contiguous portions of the cabin volume. In some such examples, the first and second aerodynamic profiles are configured to minimize one or more of an airflow or thermal flux between the first and second thermal zones.

In some examples, the first zonal duct exit and the second zonal duct exit may each include a chamber airfoil defining an upper flow chamber defining an upper exit and a lower flow chamber defining a lower exit. The chamber airfoils of each of the first and second zonal duct exits may have a curved cross-section configured to direct flow from the air source (e.g., an HVAC) unit into the respective first thermal zone and second thermal zone. In some examples, the upper flow chamber may be configured to accelerate flow at the upper exit to direct flow from the lower flow chamber transverse (e.g., substantially perpendicular) to the respective first zonal duct exit and the second zonal duct exit. In some examples, this may take advantage of a Venturi effect. For example, the upper flow chamber may be configured to accelerate flow at the upper exit to direct flow from the lower flow chamber substantially perpendicularly to the respective first zonal duct exit and the second zonal duct exit. In some examples, the flow from the lower flow chamber is directed in a direction substantially orthogonal to a cross-section of the lower exit.

In some examples, the first zonal duct exit and the second zonal duct exit may each further include a minor lip downstream relative to the chamber airfoil and adjacent the upper flow chamber, with the minor lip accelerating flow at the upper exit of the upper flow chamber. In some examples, the first zonal duct exit and the second zonal duct exit may each further include a major lip downstream relative to the chamber airfoil and adjacent the upper flow chamber. The first zonal duct exit and the second zonal duct exit, in some examples, may each include a lower airfoil defining a curved airfoil profile downstream relative to the chamber airfoil and configured to redirect flow from a first direction to a second direction transverse (e.g., substantially perpendicular) to the first direction and into the respective first thermal zone and the second thermal zone. In some examples, this may take advantage of a Coanda effect. In some examples, the radius of curvature and/or the shape of the curve of the curved airfoil profile of the lower airfoil may be tailored to create the desired flow pattern of air bending around a remote end of the curved airfoil profile.

In some examples, the system may be incorporated into a vehicle, such as, for example, an autonomous vehicle, though any other interior space is contemplated (e.g., buses, trains, planes, rooms in buildings, etc.). In some such examples, the first position may be located at a first end of the cabin volume, and the second position may be located at a second end of the cabin volume opposite the first cabin volume. The vehicle may include a first seat located in the first position and facing the second position, and a second seat located in the second position and facing the first position. In some such examples, the vehicle may also include a third position (e.g., a third seating position) adjacent the first position and facing the second end of the cabin volume, and a fourth position (e.g., a fourth seating position) adjacent the second position. In some examples, the duct network may further include a third zonal duct including a third zonal duct exit located in the cabin volume above the third position, spaced from the first zonal duct exit and the second zonal duct exit, and configured to create third aerodynamic profiles (e.g., vortices) resulting in a third thermal zone at the third position and having a third temperature and a third humidity. Some examples may also include a fourth zonal duct including a fourth zonal duct exit located in the cabin volume above the fourth position, spaced from the first zonal duct exit, the second zonal duct exit, and the third zonal duct exit, and configured to create fourth aerodynamic profiles (e.g., vortices) resulting in a fourth thermal zone at the fourth position and having a fourth temperature and a fourth humidity. In some examples, the third and fourth thermal zones may be contiguous with the first and second thermal zones, and, in some examples, the third and fourth aerodynamic profiles are configured to minimize one or more of an airflow or a thermal flux between the third and fourth thermal zones and the first and second thermal zones. In some examples, the first position, the second position, the third position, and the fourth position may include contiguous portions of the cabin volume.

In some examples, the cabin volume may include four cabin volume quadrants, each associated with a passenger seat location. In some examples, a first pair of the four passenger seat locations may be located opposite the cabin volume from a second pair of the four passenger seat locations, for example, such that one or more passengers present in the first pair of passenger seats face one or more passengers present in the second pair of passenger seats. In some examples, the cabin volume may include minimal or no physical partitions separating the four cabin volume quadrants from one another. In some examples, the first and second zonal duct exits may be located in the cabin volume to provide the first and second thermal zones at the respective first and second passenger seats, and the third and fourth zonal duct exits may be located in the cabin volume to provide to the third and fourth thermal zones at the respective third and fourth passenger seats. In some examples, one or more of the first zonal duct exit, the second zonal duct exit, the third zonal duct exit, or the fourth zonal duct exit may have substantially the same configuration.

In some examples, the duct network may also include a first comfort duct including a first comfort duct exit configured to provide flow communication from the air source (e.g., an HVAC unit) directed from the first comfort duct exit toward the first position (e.g., a first seating position). Some examples may also include a second comfort duct including a second comfort duct exit configured to provide flow communication from the air source directed from the second comfort duct exit toward the second position (e.g., a second seating position). In some examples, the first comfort duct exit and the second comfort duct exit may each include turning vanes configured to direct air flow from the first comfort duct exit and the second comfort duct exit toward the first position and the second position, respectively. Such comfort ducts may be configurable by the occupants and provide additional airflow onto the occupants.

Some examples of the system may also include a first return inlet coupled to a first air source (e.g., a first HVAC unit) and configured to draw air from the first aerodynamic profiles through the first position and into the first air source for recirculation through the first zonal duct. The system may also include a second return inlet coupled to a second air source (e.g., a second HVAC unit) and configured to draw air from the second aerodynamic profiles through the second position and into the second air source for recirculation through the second zonal duct. Such return inlets (and/or any additional components which promote flow through such inlets) may improve the isolation of airflow and/or thermal flux between adjacent thermal zones. In some examples, the first and second air sources may be a single air source, and/or the first and second return inlets may be a single return inlet.

This disclosure is also generally directed to a method of conditioning air in a volume, for example, a cabin volume substantially devoid of physical partitions separating portions of the cabin volume from one another. The method may include creating a first thermal zone in a first portion of the volume. In some examples, creating the first thermal zone may include providing flow communication between an air source (e.g., an HVAC unit) and a first zonal duct exit and a first lower zonal duct exit. Creating the first thermal zone may also, in some examples, include flowing air from the first zonal duct exit downward in first aerodynamic profiles to form the first thermal zone at a first position (e.g., a first seating position), and flowing air from the first lower zonal duct exit to compliment the first aerodynamic profiles and direct air upward and over the first position. In some examples, creating the first thermal zone may also include drawing air from the first aerodynamic profiles over the first position and into a return inlet. The method may also include creating a second thermal zone in a second portion of the volume. Creating the second thermal zone may include providing flow communication between an air source (e.g., an HVAC unit) and a second zonal duct exit and a second lower zonal duct exit spaced from the first zonal duct exit and the first lower zonal duct exit. Creating the second thermal zone may further include flowing air from the second zonal duct exit downward in second aerodynamic profiles to form the second thermal zone at a second position (e.g., a second seating position), and flowing air from the second lower zonal duct exit to compliment the second aerodynamic profiles and direct air upward and over the second position. In some examples, creating the second thermal zone may also include drawing air from the second aerodynamic profiles over the second position and into a return inlet. In some examples, the first thermal zone and the second thermal zone create a thermal zone boundary therebetween characterized by one or more of a temperature gradient or a humidity gradient across the thermal zone boundary.

In some examples, the thermal zone boundary may be characterized by a temperature gradient of at least two degrees centigrade. Other temperature gradients are contemplated. In some examples, the first and second aerodynamic profiles are configured so as to minimize one or more of an airflow or thermal flux across the thermal zone boundary.

In some examples of the method, creating the first aerodynamic profiles may include dividing a first flow into a first upper flow and a first lower flow, with the first upper flow accelerating and redirecting the first lower flow from a first direction to a second direction transverse to the first direction and into the first thermal zone. In some examples, creating the second aerodynamic profiles may include dividing a second flow into a second upper flow and a second lower flow, with the second upper flow of the second flow accelerating and redirecting the second lower flow of the second flow from a first lower flow direction to a second lower flow direction transverse to the first lower flow direction and into the second thermal zone.

Some examples of the method may also include providing flow communication between an air source (e.g., an HVAC unit) and one or more of the first zonal duct exit or the comfort duct exit, and flowing air from the one or more exits toward an occupant of the first position to induce a heat flux associated with the occupant. The heat flux may be characterized as heat transfer to or from the occupant, which may take the form of, for example, convection. In some examples, the heat flux may be perceived by the occupant as cooling the occupant if the occupant is undesirably warm and/or as heating the occupant if the occupant is undesirably cool. In some examples, the perception may be altered by flowing air across the occupant (e.g., flowing air at the upper extremities of the occupant). In such a fashion, the occupant may perceive that they are being cooled without requiring a change in a temperature set point. Such a cooling mechanism may require less energy overall, as the amount of thermal transfer required to induce a perception of cooling may be less than a targeted temperature set point.

In some examples, the method may include controlling one or more of a temperature or a humidity in the first thermal zone by, at least in part, controlling one or more of a temperature or a humidity of the air flowing from one or more of the first zonal duct exit or the lower first zonal duct exit. In some examples, this may result in the first thermal zone having and/or substantially maintaining a temperature (e.g., a preset temperature). In some examples, the method may also include controlling the heat flux associated with the occupant by controlling one or more of a temperature or an air flow speed of air flowing from the comfort duct.

In some examples, the temperature (and/or humidity) of the first thermal zone may differ from the temperature (and/or humidity) of air flowing from the comfort duct. For example, the temperature of the first thermal zone may be about 75 degrees Fahrenheit, but the temperature of air flowing from the comfort duct exit may be about 73 degrees F. In some such circumstances, an occupant in the first position may perceive that the air temperature in the first thermal zone is cooler than about 70 degrees F., due, for example, to the heat flux created by the comfort duct exit as the air from the comfort duct exit flows across the occupant. In another example, the temperature of the first thermal zone may be about 65 degrees F., but the temperature of air flowing from the comfort duct exit may be about 68 degrees F. In some such circumstances, an occupant in the first position may perceive that the air temperature in the first thermal zone is warmer than about 72 degrees F., due, for example, to the heat flux created by the comfort duct exit as the air from the comfort duct exit flows across the occupant. In some examples, this may create more efficient heating and/or cooling by reducing the level of heating and/or cooling required by the air source (e.g., an HVAC unit) for the occupant to perceive that the first thermal zone is at a desired temperature and/or humidity level.

The techniques and systems described herein may be implemented in a number of ways. Example implementations are provided below with reference to the figures.

Figure 6:
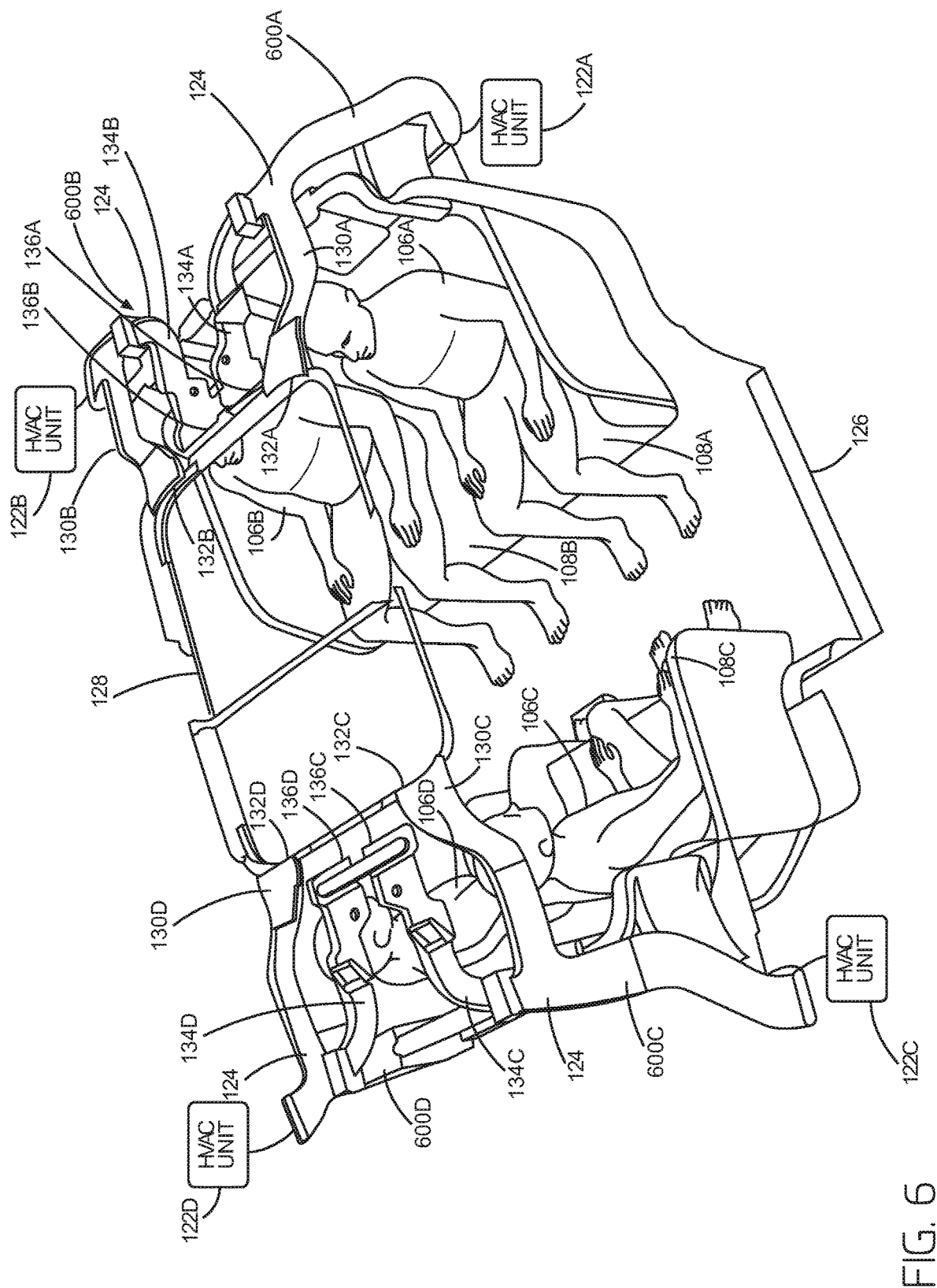
FIG. 6 is a perspective view of the example cabin shown in FIG. 5 with portions of the cabin omitted to show an example duct network of the example HVAC system.

FIG. 1 is a side cutaway view of showing an example vehicle 100 including an example cabin 102 defining a cabin volume 104 providing interior space for a number of occupants 106, each seated in a respective seat 108. The example vehicle 100 may be configured to travel via a road network from one geographic location to a destination carrying one or more of the occupants 106. For example, the cabin volume 104 may include a plurality of seats 108, which may be provided in any relative arrangement. The example vehicle 100 shown in FIG. 1 includes an example carriage-style seating arrangement. Because FIG. 1 is a side view, only two occupants 106 and two seats 108 are shown, each on opposite ends of the cabin volume 104 and facing one another. However, it is contemplated that each end of the cabin volume 104 may include two, three, or more seats 108 adjacent one another, and thus, the cabin volume 104 may be configured to provide seating for four, six, or more occupants 106, for example, as shown in FIG. 6, which shows four occupants 106 seated in four seats 108, each of a pair of the occupants 106 seated in seats 108 facing another pair of occupants 106 seated in seats 108. In some examples, one or more of the seats 108 may be configured to provide seating for a single occupant 106, and in other examples, one or more of the seats 108 may be bench-style seats, each configured to provide seating for two or more occupants 108. Other relative arrangements and numbers of seats 106 are contemplated.

For the purpose of illustration, the vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 100 may be any configuration of vehicle, such as, for example, a van, a sport utility vehicle, a cross-over vehicle, a truck, a bus, an agricultural vehicle, and a construction vehicle. The vehicle 100 may be powered by one or more internal combustion engines, one or more electric motors, hydrogen power, any combination thereof, and/or any other suitable power sources. Although the example vehicle 100 has four wheels 110, the systems and methods described herein may be incorporated into vehicles having fewer or a greater number of wheels, tires, and/or tracks. The example vehicle 100 may have four-wheel steering and may operate generally with equal performance characteristics in all directions, for example, such that a first end 112 of the vehicle 100 is the front end of the vehicle 100 when travelling in a first direction 114, and such that the first end 112 becomes the rear end of the vehicle 100 when traveling in the opposite, second direction 116, as shown in FIG. 1. Similarly, a second end 118 of the vehicle 100 is the front end of the vehicle 100 when travelling in the second direction 116, and such that the second end 118 becomes the rear end of the vehicle 100 when traveling in the opposite, first direction 114. These example characteristics may facilitate greater maneuverability, for example, in small spaces or crowded environments, such as parking lots and urban areas.

As shown in FIG. 1, the example vehicle 100 may include an HVAC system 120 configured to provide a comfortable temperature and/or humidity in the cabin volume 104 of the vehicle, and in some examples described herein, provide an ability for one or more of the occupants 106 to adjust the temperature and/or humidity according to their respective preferences. As shown in FIG. 1, the example HVAC system 120 may include one or more HVAC units 122. For example, as shown in FIG. 1, the example HVAC system 120 includes an HVAC unit 122 at each end of the vehicle 100, and as explained herein, each HVAC unit 122 may be configured to provide the ability for the occupants 106 at each respective end of the vehicle 100 to adjust the temperature and/or humidity according to their respective preferences. The HVAC units 122 may include any known systems and/or devices configured to cool air, heat air, dehumidify air, humidify air, freshen air, and/or add fragrance, such as, for example, compressors, heat pumps, condensing coils, evaporating coils, blowers, filters, etc.

As shown in FIG. 1, the example the HVAC system 120 includes a duct network 124 coupled to each of the HVAC units 122 and configured to provide flow communication between the respective HVAC units 122 and the cabin volume 104. For example, the cabin 102 includes a floor 126 and a ceiling 128. One or more of the duct networks 124 may include one or more zonal ducts 130 extending between a respective HVAC unit 122 and one or more zonal duct exits 132 adjacent the ceiling 128. In some examples, one or more of the duct networks 124 may include one or more comfort ducts 134 extending between a respective HVAC unit 122 and one or more comfort duct exits 136. The example HVAC system 120 shown in FIG. 1 also includes a lower zonal duct 138 extending between a respective HVAC unit 122 and one or more lower zonal duct exits 140 adjacent the floor 126 of the cabin volume 104.

The zonal duct exits 130 and/or the lower zonal duct exits 140 may be configured to provide a thermal zone 142 corresponding to one or more of the seat locations, for example, such that an occupant 106 in a particular seat location is able to adjust the temperature and/or humidity in the thermal zone 142, for example, using an adjustment interface, according to the respective occupant 106's preferences independent of a thermal zone 142 corresponding to another seat location adjacent the thermal zone 142 corresponding to the occupant 106's seat location. For example, as shown in FIG. 1, the zonal duct exits 132 provide a downward flow 144 into the thermal zone 142. In some examples, the lower zonal ducts 138 and lower zonal duct exits 140 provide an upward flow 146 into the thermal zones 142. In some examples, the combination flows may also provide an inward flow 148 toward the occupant 106 in the respective thermal zone 142.

In some examples, the HVAC system 120 may also include return inlets 150 coupled to each of the HVAC units 122 and configured draw air from a respective thermal zone 142 into the HVAC unit 122. For example, the seats 108 may include a headrest 152, and the return inlets 150 may be configured to draw air from aerodynamic profiles (e.g., vortices) of the respective thermal zones 142 past the respective headrests 152, so that the air passes over the respective occupant 106 and into the HVAC unit 122. Thus, the return inlet 150, in some examples, assists with substantially generating and/or maintaining the thermal zone 142. In addition, the return inlet 150 facilitates recirculation of air for the corresponding thermal zone 142. Thus, air from the thermal zone 142 may be cooled (or heated) by the HVAC unit 122, passed though the zonal duct exit 132, the lower zonal duct exit 140, and/or the comfort duct exit 136 to create aerodynamic profiles for the thermal zone 142, and thereafter be drawn back into the return inlet 150. The air entering the return inlet 150, already cooled (or heated), may be used to assist with further cooling (or heating) of the air for the thermal zone 142. Because the thermal zone 142, in some examples, substantially reduces diffusion of air and/or humidity into or out of the thermal zone 142, conditioning the air may be relatively more efficient as compared to some conventional air conditioning that does not recirculate conditioned air or that draws air into the interior of the volume from the outside and that requires relatively more energy to be cooled (or heated). In addition, or alternatively, by circulating the air within the thermal zone 142, some examples of the HVAC system 120 may be more effective in achieving and/or substantially maintaining a desired temperature and/or humidity in the thermal zone 142.

As shown in FIG. 1, some examples of the HVAC system may include a thermal zone control system 154 configured to control one or more thermal zones of the HVAC system 120. For example, the thermal zone control system 154 may be configured to control parameters, such as, for example, the temperature, humidity, and/or flow rate of air exiting one or more of the zonal duct exits 132, the lower zonal duct exits 140, or the comfort duct exits 136, to achieve a comfort level desired by an occupant 106 seated in one or more of the seats 108. In some examples, the thermal zone control system 154 may be configured to automatically control one or more of these parameters, for example, according to preset levels. In some examples, one or more of these parameters may be controlled based on a signal received from a device carried (or associated with) an occupant 106 of a particular seat 108. For example, the device may be any device capable of communicating a signal to the thermal zone control system 154, such as, for example, a smart phone, a tablet, a computer, and/or a wearable communication device, such as, for example, glasses, a watch, a bracelet, a necklace, an anklet, a pin/brooch, cufflinks, earrings, or rings, etc., which, in some examples, may include an application configured to facilitate selection of preferences by the occupant. In some examples, the thermal zone control system 154 may include an occupant controller 156, and such preferences may be incorporated into a signal received by the occupant controller 156, which may be configured to receive such a signal and cause the thermal zone control system 154 to operate the HVAC system 120 to substantially achieve the occupant 106's preferences relating to the parameters. In some examples, the occupant controller 156 may be incorporated into the interior of the volume 104 in a place accessible to the occupant 106, such as one or more of a touch screen, physical button, or otherwise proximate a seat of the occupant 106.

Figure 2:
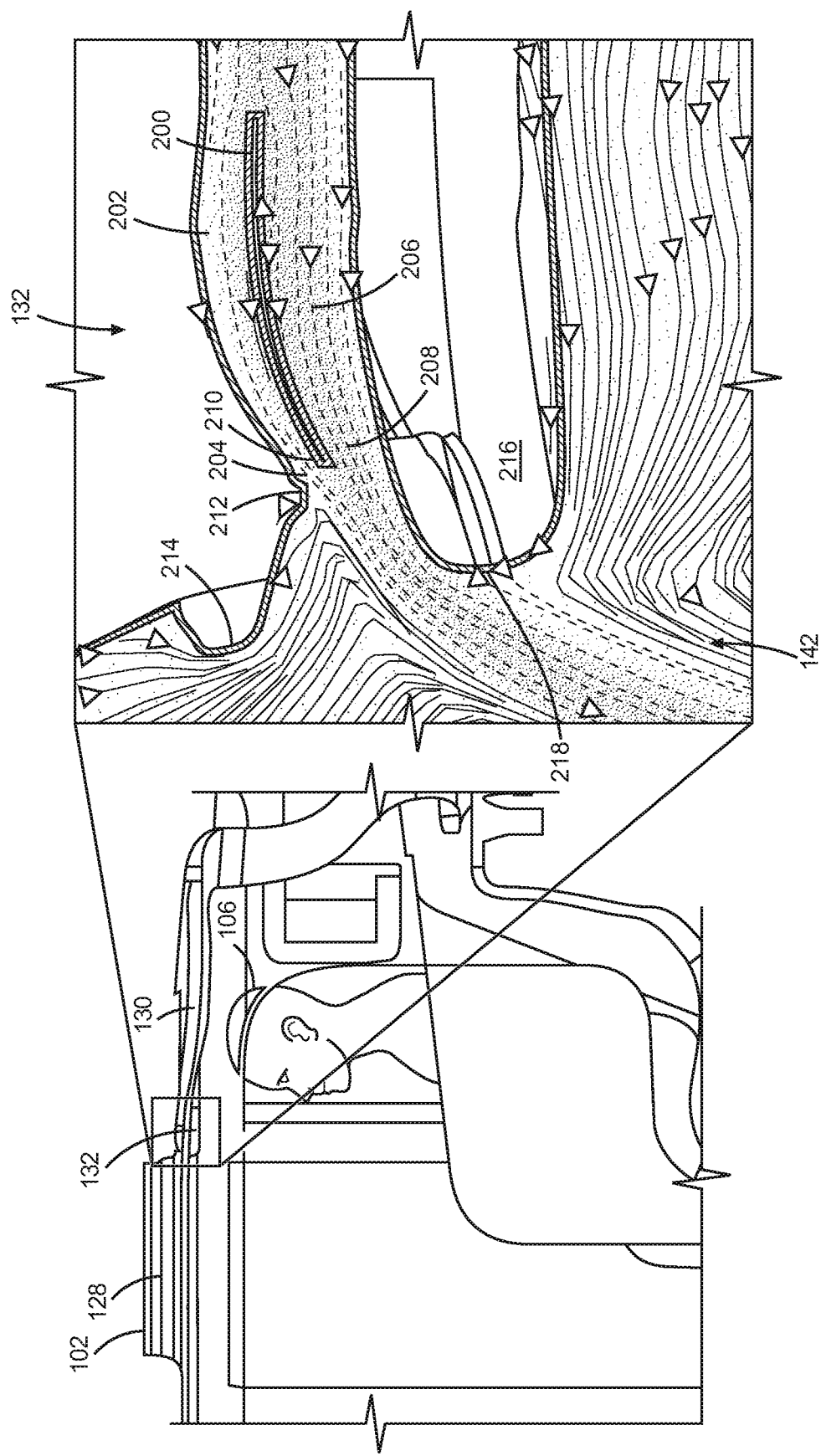
FIG. 2 is a side view of an example relationship between an example thermal zone, an example zonal duct exit, and an example occupant of the cabin, including a detailed side section view of the example zonal duct exit.

FIG. 2 is a side view of an example relationship between an example thermal zone 142, an example zonal duct exit 132, and an example occupant 106 of the cabin 102, including a detailed side section view of the example zonal duct exit 132. As shown in FIG. 2, the example zonal duct exit 132 includes a chamber airfoil 200 defining an upper flow chamber 202 defining an upper exit 204 and a lower flow chamber 206 defining a lower exit 208. In the example shown, the chamber airfoil 200 has a curved cross-section configured to direct flow from the HVAC unit into the thermal zone 142. The example cross-section of the chamber airfoil 200 is curved downward at a downstream end 210 such that the chamber airfoil 200 is concave facing the lower flow chamber 206. The upper flow chamber 202 is configured to accelerate flow at the upper exit 204 (as may be based on the tapered cross-sectional area) to direct flow from the lower flow chamber 206 transverse to the zonal duct exit 132 and downward into the thermal zone 142, as shown in FIG. 2. Some examples take advantage of a Venturi effect to accelerate the flow.

As shown in FIG. 2, the first zonal duct exit 132 also includes a minor lip 212 downstream relative to the chamber airfoil 200 and adjacent the upper flow chamber 202. In some examples, the minor lip 212 assists with accelerating flow at the upper exit 204 of the upper flow chamber 202. The first zonal duct exit 132 may also include a major lip 214 downstream relative to the chamber airfoil 200 and adjacent the upper flow chamber 202. The major lip 214 may assist with creating a relatively higher pressure, for example, using air flow from one or more of the upper common duct exits 136 (see FIG. 8 and the related discussion). The zonal duct exit 132 may also include a lower airfoil 216 defining a curved airfoil profile 218 downstream relative to the chamber airfoil 200 and configured to redirect flow downward into the thermal zone 142. Some examples may take advantage of a Coanda effect to redirect flow from a first direction to a second direction transverse to the first direction and into the thermal zone 142. In some examples, the second direction may be substantially perpendicular with respect to the first direction.

During operation according to some examples, air flows from the HVAC unit 122 to the zonal duct exit 132, and a thermal zone 142 is created in the cabin volume 104, such that a first thermal zone and a second thermal zone adjacent the first thermal zone create a thermal zone boundary therebetween characterized by one or more of a temperature gradient or a humidity gradient on opposite sides of the thermal zone boundary. The configuration of the zonal duct exit 132 creates aerodynamic profiles (e.g., vortices) by dividing air flowing from the zonal duct exit 132 upstream of the upper exit 204 and the lower exit 208 into an upper flow and a lower flow. As a result of the configuration, the upper flow accelerates and diverts the lower flow into the thermal zone, and creates an aerothermal volume defining the thermal zone 142.

Figure 3:
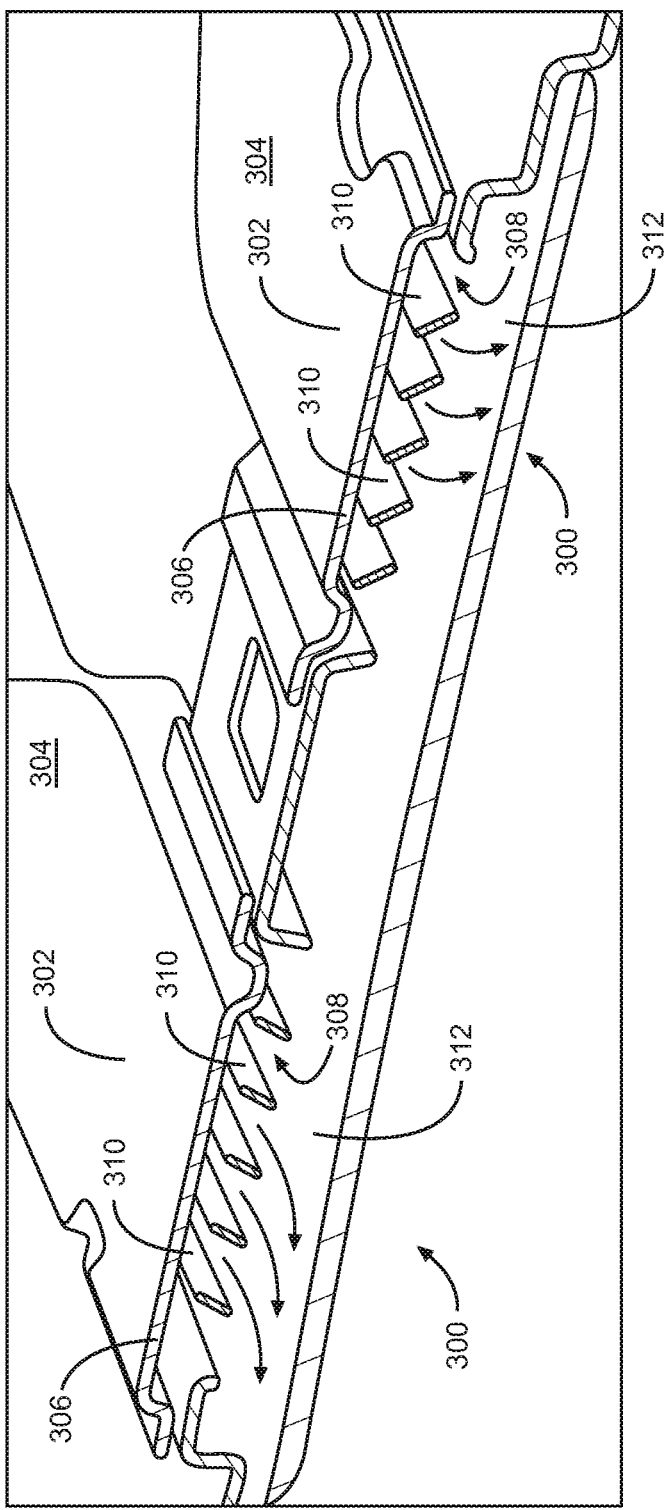
FIG. 3 is a perspective partial section view of two example comfort duct exits.

FIG. 3 is a perspective partial section view of two example comfort duct exits 300 located at respective ends 302 of respective comfort ducts 304. The comfort duct exits 300 and/or the comfort ducts 304 may correspond respectively to the comfort duct exits 136 and comfort ducts 134 shown in, for example, FIG. 1. Although the comfort duct exits 300 shown in FIG. 3 are spaced closely to one another (e.g., adjacent one another), it is contemplated that the comfort duct exits 300 may be spaced remotely from one another.

In the examples shown in FIG. 3, the comfort ducts 300 include a chamber barrier 306 defining a chamber 308 in flow communication with the respective comfort ducts 304. The example comfort duct exits 300 shown in FIG. 3 also include turning vanes 310 configured to redirect air flow toward a corresponding occupant 106 (e.g., toward upper extremities of a corresponding occupant 106) seated in a corresponding seat 108. In the example shown, the turning vanes 310 are fixed relative to the chamber 308, and angled to direct flow laterally outward, as depicted by the arrows 312, and toward the corresponding occupant. Other configurations of turning vanes, fixed or pivotable, are contemplated.

Figure 4:
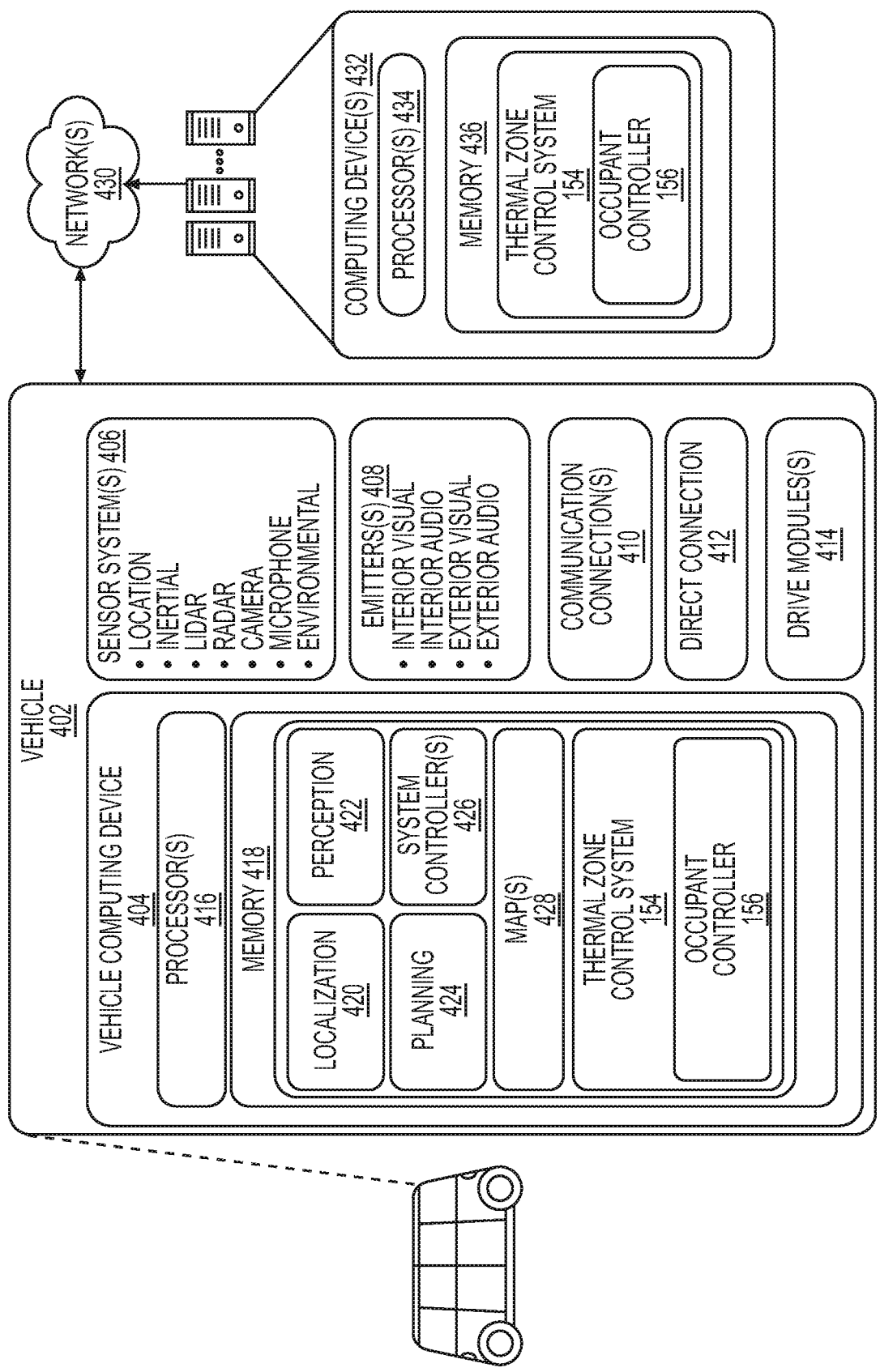
FIG. 4 is a block diagram of an example system for implementing the HVAC system and related techniques described herein.

FIG. 4 depicts a block diagram of an example system 400 for implementing the techniques described herein. In at least some examples, the system 400 may include a vehicle 402, which may correspond to the example vehicle 100 shown in FIG. 1. The vehicle 402 may include a vehicle computing device 404, one or more sensor systems 406, one or more emitters 408, one or more communication connections 410, at least one direct connection 412, and one or more drive modules 414.

The vehicle computing device 404 may include one or more processors 416 and memory 418 communicatively coupled with the one or more processors 416. In the illustrated example, the vehicle 402 is an autonomous vehicle. However, the vehicle 402 may be any other type of vehicle. In the illustrated example, the memory 418 of the vehicle computing device 404 stores a localization component 420, a perception component 422, a planning component 424, one or more system controllers 426, one or more maps 428, and an example thermal zone control system 154, including an example occupant controller 156. Though depicted in FIG. 4 as residing in memory 418 for illustrative purposes, it is contemplated that the localization component 420, the perception component 422, the planning component 424, the one or more system controllers 426, the one or more maps 428, and the thermal zone control system 154 may additionally, or alternatively, be accessible to the vehicle 402 (e.g., stored on, or otherwise accessible by, memory remote from the vehicle 402).

In at least one example, the localization component 420 may be configured to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment and may continuously determine a location and/or orientation of the autonomous vehicle within the map. In some examples, the localization component 420 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 420 may provide data to various components of the vehicle 402 to determine an initial position of an autonomous vehicle for generating a candidate trajectory, as discussed herein.

In some examples, the perception component 422 may be configured to perform object detection, segmentation, and/or classification. In some examples, the perception component 422 may provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional and/or alternative examples, the perception component 422 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In at least one example, the planning component 424 may determine a location of a user based on image data of an environment received from the user using, for example, bags of binary words with image based features, artificial neural network, and the like. Further, the planning component 424 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 402 may stop to pick up a passenger. In at least one example, the planning component 424 may determine a pickup location based at least in part on determining a user identity (e.g., determined via image recognition or received as an indication from a user device, as discussed herein).

In at least one example, the vehicle computing device 404 may include one or more system controllers 426, which may be configured to control steering, propulsion, braking, safety, emitters, communication, and other systems of the vehicle 402. These system controller(s) 426 may communicate with and/or control corresponding systems of the drive module(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment, and may be loaded into working memory as needed. In at least one example, the one or more maps 428 may include at least one map (e.g., images and/or a mesh). In some example, the vehicle 402 may be controlled based at least in part on the maps 428. That is, the maps 428 may be used in connection with the localization component 420, the perception component 422, and/or the planning component 424 to determine a location of the vehicle 402, identify objects in an environment, and/or generate routes and/or trajectories to navigate within an environment.

In some examples, the one or more maps 428 may be stored on a remote computing device(s) (such as the computing device(s) 432) accessible via network(s) 430. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As shown in FIG. 4, in some examples, the thermal zone control system 154 may be stored in the memory 418 of the computing device 404 of the vehicle 402 or remote from the vehicle 402 in the memory 436 of the computing device(s)

432. In some examples, some portions of the thermal zone control system 154 may be stored in the memory 418 of the computing device 404 of the vehicle 402, and other portions of the thermal zone control system 154 may be stored remotely in the memory 436 of the computing device(s) 432, and the separately located portions of the thermal zone control system 154 may operate together in a coordinated manner.

In some examples, aspects of some or all of the components discussed herein may include any models, algorithms, and/or machine learning algorithms. For example, in some examples, the components in the memory 418 and/or the memory 436 may be implemented as a neural network.

As described herein, an exemplary neural network is a biologically inspired algorithm which passes input data through a series of connected layers to produce an output. Each layer in a neural network may also include another neural network, or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 406 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 406 may include multiple examples of each of these or other types of sensors. For example, the LIDAR sensors may include individual LIDAR sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or alternatively, the sensor system(s) 406 may send sensor data, via the one or more networks 430, to the one or more computing device(s) at a particular frequency, after a lapse of a predetermined period of time, in near real-time, etc.

The vehicle 402 may also include one or more emitters 408 for emitting light and/or sound, as described above. The emitters 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 402 may also include one or more communication connection(s) 410 that enable communication between the vehicle 402 and one or more other local or remote computing device(s). For example, the communication connection(s) 410 may facilitate communication with other local computing device(s) on the vehicle 402 and/or the drive module(s) 414. Also, the communication connection(s) 410 may allow the vehicle 402 to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 430. For example, the communications connection(s) 410 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive modules 414. In some examples, the vehicle 402 may have a single drive module 414. In at least one example, if the vehicle 402 has multiple drive modules 414, individual drive modules 414 may be positioned on opposite ends of the vehicle 402 (e.g., the front and the rear, etc.). In at least one example, the drive module(s) 414 may include one or more sensor systems to detect conditions of the drive module(s) 414 and/or the surroundings of the vehicle 402. By way of example and not limitation, the sensor system(s) 406 may include one or more wheel encoders (e.g., rotary encoders) to sense rotation of the wheels (e.g., wheels 110 in FIG. 1)) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 414. In some cases, the sensor system(s) on the drive module(s) 414 may overlap or supplement corresponding systems of the vehicle 402 (e.g., sensor system(s) 406).

The drive module(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 may include a drive module controller, which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 414. Furthermore, the drive module(s) 414 also include one or more communication connection(s) that enable communication by the respective drive module with one or more other local or remote computing device(s).

In at least one example, the direct connection 412 may provide a physical interface to couple the one or more drive module(s) 414 with the body of the vehicle 402. For example, the direction connection 412 may allow the transfer of energy, fluids, air, data, etc. between the drive module(s) 414 and the vehicle 402. In some examples, the direct connection 412 may further releasably secure the drive module(s) 414 to the body of the vehicle 402.

In at least one example, the localization component 420, perception component 422, the planning component 424, and/or the thermal zone control system 154 may process sensor data, as described above, and may send their respective outputs, over the one or more network(s) 430, to one or more computing device(s) 432. In at least one example, the localization component 420, the perception component 422, the planning component 424, and/or the thermal zone control system 154 may send their respective outputs to the one or more computing device(s) 432 at a particular frequency, after a lapse of a predetermined period of time, in near real-time, etc.

The processor(s) 416 of the vehicle 402 and/or the processor(s) 434 of the computing device(s) 432 may be any suitable processor capable of executing instructions to process data and perform operations as described herein. By way of example and not limitation, the processor(s) 416 and 434 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 436 are examples of non-transitory computer-readable media. The memory 418 and 436 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 432, and/or components of the computing device(s) 432 may be associated with the vehicle 402. That is, the vehicle 402 may perform one or more of the functions associated with the computing device(s) 432, and vice versa.

Figure 5:
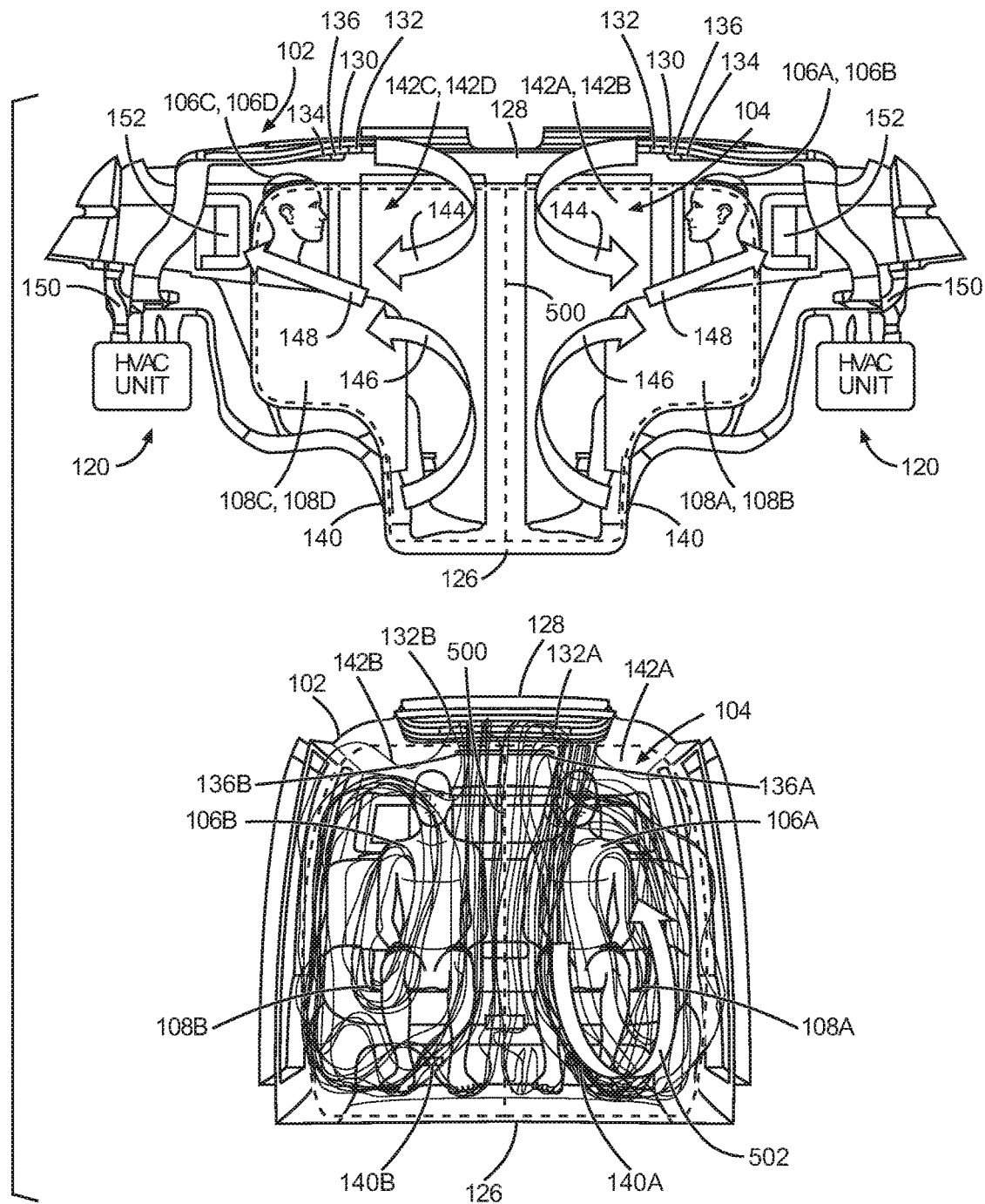
FIG. 5 shows side and front views of an example cabin defining an example cabin volume and an example HVAC system.

FIG. 5 shows side and front views of an example cabin 102 defining an example cabin volume 104 configured to carry four occupants 106A, 106B, 106C, and 106D in corresponding seats 108A, 108B, 108C, and 108D, and an example HVAC system 120 configured to provide independent adjustability of temperature and/or humidity for one or more (e.g., four) of the occupants 106A-106D. For example, the example HVAC system 120 shown in FIG. 5 is configured to provide four thermal zones 142A, 142B, 142C, and 142D corresponding to the seating locations of the seats 108A-108D, respectively.

One or more (e.g., each) of the thermal zones 142A-142D may be characterized by a volume having a temperature and/or humidity which may be different than the temperature and/or the humidity in an adjacent thermal zone, such that a temperature and/or humidity gradient may exist at respective thermal zone boundaries 500 between adjacent thermal zones 142A, 142B, 142C, and/or 142D, and such that diffusion of the temperature and/or humidity between the adjacent thermal zones 142A, 142B, 142C, and/or 142D is aerodynamically inhibited (or otherwise minimized), for example, as a result of the combinations of airflows (aerodynamic profiles) generated by one or more of the zonal duct exits 132, the comfort duct exits 136, or the lower zonal duct exits 140. In some examples, the respective thermal zone boundaries 500 between adjacent thermal zones 142 may take the form of a two-dimensional or three-dimensional surface defined by the temperature and/or humidity gradient present at the respective thermal zone boundaries 500. In some examples, the temperature gradient may range from, for example, about 0.2 degrees Fahrenheit (F) to about 8 degrees F., such as, for example, from about 0.2 degrees F. to about 6 degrees F., from about 0.2 degrees F. to about 5 degrees F., from about 0.2 degrees F. to about 4 degrees F., from about 0.2 degrees F. to about 3 degrees F., or from about 0.2 degrees F. to about 2 degrees F. As a result, some examples of the HVAC system 120 may be effective in providing two adjacent occupants (e.g., 106A and 106B, 106A and 106C, 106B and 106D, or 106C and 106D) in the cabin 102 with the ability to control the temperature and/or humidity of the portion of the cabin volume 104, which they occupy independently of one another.

As shown in the lower portion of FIG. 5 (the front view), some examples of the lower zonal ducts exits 140 may be configured to direct air flowing from the lower zonal duct exit 140 toward the side of the cabin 102. This may assist with creation of the aerodynamic profiles and cause the air to generally flow outward toward the sides of the cabin 102 and up along the occupant 106, for example, as schematically depicted by arrow 502, and thereafter be drawn into the return inlet 150 behind the occupant 106.

FIG. 6 is a perspective view of the example cabin 102 shown in FIGS. 1 and 5, with portions of the cabin 102 omitted to show an example duct network 124 of the example HVAC system 120. As shown in FIG. 6, the example duct network 124 includes four zonal ducts 130A, 130B, 130C, and 130D, each extending between a respective HVAC unit 122A, 122B, 122C, and 122D and respective zonal duct exits 132A, 132B, 132C, and 132D that are adjacent the ceiling 128 of the cabin 102. In some examples, the two of the HVAC units at each end of the cabin 102 may be combined.

As shown in FIG. 6, the duct network 124 also includes four comfort ducts 134A, 134B, 134C, and 134D extending between a respective HVAC units 122A-122D and respective comfort duct exits 136A, 136B, 136C, and 136D, which are adjacent the ceiling 128 of the cabin 102 and, in some examples, are closer to the center of the cabin 102 than the zonal duct exits 132A-132D. In some examples, for example as shown in FIG. 6, corresponding zonal ducts and the comfort ducts share a duct section 600 extending from the corresponding HVAC unit. For example, as shown, the zonal duct 130A and the comfort duct 134A are both in flow communication with duct section 600A. Similarly, the zonal duct 130B and the comfort duct 134B are both in flow communication with duct section 600B, the zonal duct 130C and the comfort duct 134C are both in flow communication with duct section 600C, and the zonal duct 130D and the comfort duct 134D are both in flow communication with duct section 600D.

Figure 7:
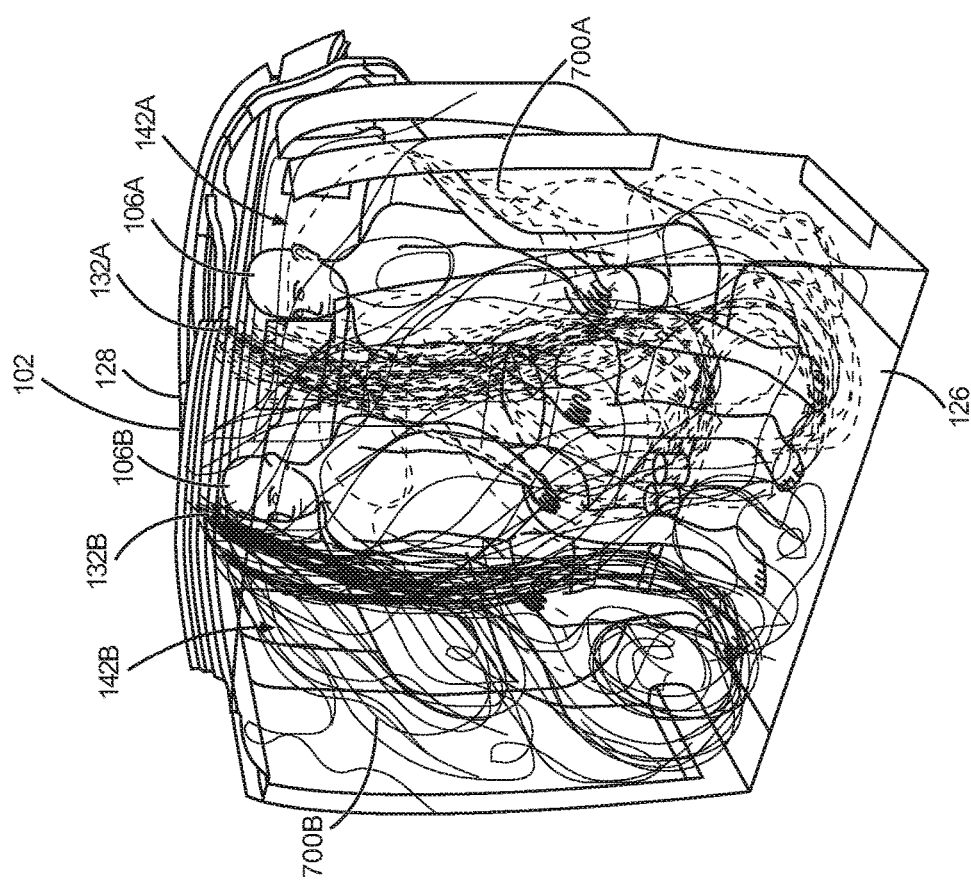
FIG. 7 is a partial perspective view of the example cabin shown in FIG. 5 including pictorial representations of two example thermal zones created by the HVAC system.

FIG. 7 is a partial perspective view of the example cabin 102 shown in FIG. 6, including pictorial representations of two example thermal zones 142A and 142B created by the example HVAC system 120. As shown in FIG. 7, example depictions of flow lines 700A and 700B correspond to the air flow in each of the thermal zones 142A and 142B. The flow lines 700A are dashed, and the flow lines 700B are solid to distinguish them from one another. As shown in FIG. 7, the air flow in each of the thermal zones 142A and 142B creates an aerodynamic circulation that substantially prevents diffusion of the air flow between the adjacent thermal zones 142A and 142B, even when a temperature and/or humidity gradient exists between the two thermal zones 142A and 142B. As a result, a thermal zone boundary is created between the two thermal zones 142A and 142B, and the two occupants 106A and 106B corresponding to the thermal zones 142A and 142B are able to adjust and substantially maintain a preferred temperature and/or a preferred humidity in their respective thermal zones 142A and 142B according to their respective preferences independent of one another.

Figure 8:
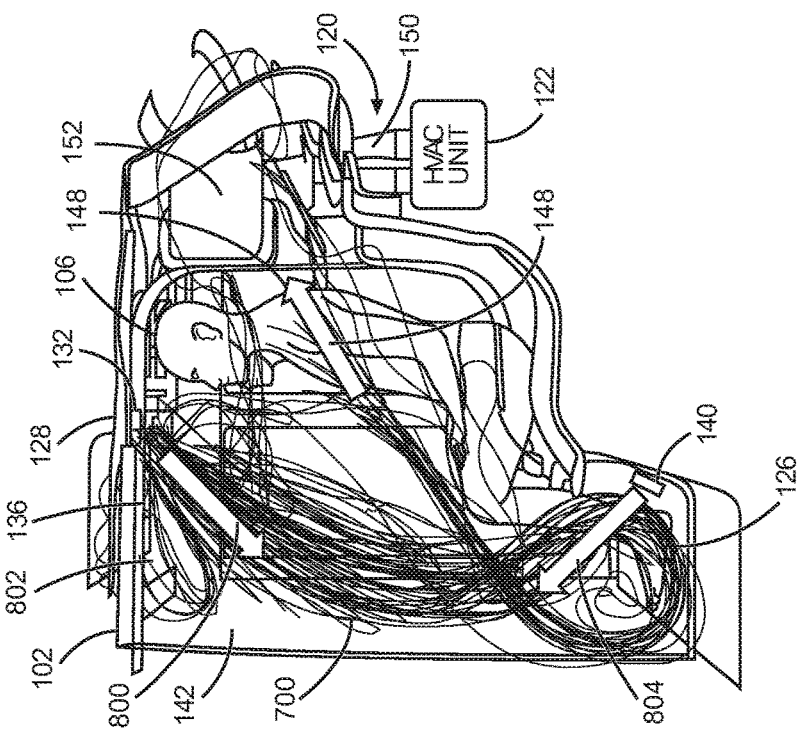
FIG. 8 is a side view showing an example thermal zone created by a portion of an example HVAC system.

FIG. 8 is a side view showing an example thermal zone 142 created by a portion of an example HVAC system 120 showing flow lines 700 created by the aerodynamics of the HVAC system 120. As shown in FIG. 8, the configuration of the zonal duct exit 132 creates a downward flow 800 transverse (e.g., substantially perpendicular) to the ceiling 128 of the cabin 102 in front of the occupant 106. The lower zonal duct exit 140 creates a lower circulation zone 804 at the occupant 106's feet and helps direct the downward flow 800 from the zonal duct exit 132 back upward and toward the occupant 106, for example, as discussed with respect to FIG. 5. The return inlet 150 draws the air flow up and over the occupant 106, for example, past the headrest 152, for example, as depicted by arrow 148. This example configuration results in creating the thermal zone 142 for the occupant 106 shown.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. An example system comprising:
    a cabin defining a cabin volume, the cabin volume comprising at least two adjacent regions; and
    a heating ventilation and air conditioning (HVAC) system coupled to the cabin and configured to alter one or more of temperature or humidity within the cabin volume, the HVAC system comprising:
        an HVAC unit configured to alter one or more of temperature or humidity; and
        a duct network in flow communication with the HVAC unit and the cabin volume, the duct network comprising:
        a first zonal duct comprising a first zonal duct exit located in the cabin volume above a first seating position and configured to create first aerodynamic profiles resulting in a first thermal zone at the first seating position having a first temperature and a first humidity, and
        a second zonal duct comprising a second zonal duct exit located in the cabin volume above a second seating position, spaced from the first zonal duct exit, and configured to create second aerodynamic profiles resulting in a second thermal zone at the second seating position and having a second temperature and a second humidity,
        wherein one or more of:
            the first temperature differs from the second temperature, or
            the first humidity differs from the second humidity,
            wherein the first and second thermal zones are contiguous portions of the cabin volume, and
            wherein the first and second aerodynamic profiles are configured to minimize one or more of an airflow or thermal flux between the first and second thermal zones.

B. The system of example A, wherein the first zonal duct exit and the second zonal duct exit each comprise a chamber airfoil defining an upper flow chamber defining an upper exit and a lower flow chamber defining a lower exit, the chamber airfoil having a curved cross-section configured to direct flow from the HVAC unit into the respective first thermal zone and second thermal zone, and wherein the upper flow chamber is configured to accelerate flow at the upper exit to direct flow from the lower flow chamber transverse to the respective first zonal duct exit and the second zonal duct exit.

C. The system of example A or example B, wherein the flow from the lower flow chamber is directed in a direction substantially orthogonal to a cross-section of the lower exit.

D. The system of any one of example A through example C, wherein the first zonal duct exit and the second zonal duct exit each comprise a chamber airfoil defining an upper flow chamber defining an upper exit and a lower flow chamber defining a lower exit, and wherein the first zonal duct exit and the second zonal duct exit each further comprise a lower airfoil defining a curved airfoil profile downstream relative to the chamber airfoil and configured to redirect flow from a first direction to a second direction transverse to the first direction and into the respective first thermal zone and the second thermal zone.

E. The system of any one of example A through example D, wherein:
  the system is a vehicle;
  the first seating position is located at a first end of the cabin volume;
  the second seating position is located at a second end of the cabin volume opposite the first cabin volume; and
  the vehicle further comprises:
    a first seat located in the first seating position and facing the second seating position; and
    a second seat located in the second seating position and facing the first seating position.

F. The system of any one of example A through example E, further comprising:
  a third seating position adjacent the first seating position and facing the second end of the cabin volume; and
  a fourth seating position adjacent the second seating position,
wherein the duct network further comprises:
  a third zonal duct comprising a third zonal duct exit located in the cabin volume above the third seating position, spaced from the first zonal duct exit and the second zonal duct exit, and configured to create third aerodynamic profiles resulting in a third thermal zone at the third seating position and having a third temperature and a third humidity; and
  a fourth zonal duct comprising a fourth zonal duct exit located in the cabin volume above the fourth seating position, spaced from the first zonal duct exit, the second zonal duct exit, and the third zonal duct exit, and configured to create fourth aerodynamic profiles resulting in a fourth thermal zone at the fourth seating position and having a fourth temperature and a fourth humidity,
  wherein the third and fourth thermal zones are contiguous with the first and second thermal zones, and
  wherein the third and fourth aerodynamic profiles are configured to minimize one or more of an airflow or a thermal flux between the third and fourth thermal zones and the first and second thermal zones.

G. The system of any one of example A through example F, wherein the first seating position, the second seating position, the third seating position, and the fourth seating position comprise contiguous portions of the cabin volume.

H. An example system comprising:
  a duct network coupled to an air source and configured to provide flow communication between the air source and a cabin volume, the duct network comprising:
    a first zonal duct comprising a first zonal duct exit configured to create first aerodynamic profiles resulting in a first thermal zone at a first position in the cabin volume and having a first temperature and a first humidity, and
    a second zonal duct comprising a second zonal duct exit configured to create second aerodynamic profiles resulting in a second thermal zone at a second position in the cabin volume and having a second temperature and a second humidity, the interface between the first and second thermal zones comprising a thermal boundary,
    wherein one or more of:
      the first temperature differs from the second temperature, or
      the first humidity differs from the second humidity,
    wherein the first and second thermal zones comprise contiguous portions of the cabin volume, and
    wherein the first and second aerodynamic profiles are configured to minimize one or more of an amount of thermal transfer or air flow across the thermal boundary.

I. The system of example H, wherein the duct network further comprises:
  a first comfort duct comprising a first comfort duct exit configured to provide flow communication from the air source directed from the first comfort duct exit toward the first position; and
  a second comfort duct comprising a second comfort duct exit configured to provide flow communication from the air source directed from the second comfort duct exit toward the second position.

J. The system of example H or example I, wherein the first comfort duct exit and the second comfort duct exit each comprise turning vanes configured to direct air flow from the first comfort duct exit and the second comfort duct exit toward the first position and the second position, respectively.

K. The system of any one of example H through example J, further comprising:
  a first lower zonal duct comprising a first lower zonal duct exit configured to supplement the first aerodynamic profiles resulting in the first thermal zone at the first position; and
  a second lower zonal duct comprising a second lower zonal duct exit configured to supplement the second aerodynamic profiles resulting in the second thermal zone at the second first position.

L. The system of any one of example H through example K, further comprising:
  a first return inlet coupled to a first air source and configured to draw air from the first aerodynamic profiles through the first position and into the first air source for recirculation; and
  a second return inlet coupled to a second air source and configured to draw air from the second aerodynamic profiles through the second position and into the second air source for recirculation.

M. The system of any one of example H through example L, wherein the first zonal duct exit and the second zonal duct exit each comprise a chamber airfoil defining an upper flow chamber defining an upper exit and a lower flow chamber defining a lower exit, the chamber airfoil having a curved cross-section configured to direct flow from the air source into the respective first thermal zone and second thermal zone, and wherein the upper flow chamber is configured to accelerate flow at the upper exit to direct flow from the lower flow chamber transverse to the respective first zonal duct exit and the second zonal duct exit.

N. The system of any one of example H through example M, wherein the first zonal duct exit and the second zonal duct exit each comprise a chamber airfoil defining an upper flow chamber defining an upper exit and a lower flow chamber defining a lower exit, and wherein the first zonal duct exit and the second zonal duct exit each further comprise a minor lip downstream relative to the chamber airfoil and adjacent the upper flow chamber, the minor lip accelerating flow at the upper exit of the upper flow chamber.

O. The system of any one of example H through example N, wherein the first zonal duct exit and the second zonal duct exit each comprise a chamber airfoil defining an upper flow chamber defining an upper exit and a lower flow chamber defining a lower exit, and wherein the first zonal duct exit and the second zonal duct exit each further comprise a major lip downstream relative to the chamber airfoil and adjacent the upper flow chamber.

P. The system of any one of example H through example O, wherein the first zonal duct exit and the second zonal duct exit each comprise a chamber airfoil defining an upper flow chamber defining an upper exit and a lower flow chamber defining a lower exit, and wherein the first zonal duct exit and the second zonal duct exit each further comprise a lower airfoil defining a curved airfoil profile downstream relative to the chamber airfoil and configured to redirect flow from a first direction to a second direction transverse to the first direction and into the respective first thermal zone and the second thermal zone.

Q. The system of any one of example H through example P, further comprising:
a third zonal duct comprising a third zonal duct exit configured to be located above a third position and spaced from the first zonal duct exit and the second zonal duct exit, and configured to create third aerodynamic profiles resulting in a third thermal zone having a third temperature and a third humidity, and
a fourth zonal duct comprising a fourth zonal duct exit configured to be located above a fourth position and spaced from the first zonal duct exit, the second zonal duct exit, and the third zonal duct exit, and configured to create fourth aerodynamic profiles resulting in a fourth thermal zone having a fourth temperature and a fourth humidity.

R. The system of any one of example H through example Q, wherein:
the first zonal duct exit and the second zonal duct exit face a first common direction, and the first zonal duct exit and the second zonal duct exit are configured to provide the first thermal zone adjacent the second thermal zone; and
the third zonal duct exit and the fourth zonal duct exit face a second common direction, and the third zonal duct exit and the fourth zonal duct exit are configured to provide the third thermal zone adjacent the fourth thermal zone.

S. An example method of conditioning air in a volume, the method comprising:
creating a first thermal zone in a first portion of the volume, creating the first thermal zone comprising:
providing flow communication between a heating ventilation and air conditioning (HVAC) unit and a first zonal duct exit and a first lower zonal duct exit;
flowing air from the first zonal duct exit downward in first aerodynamic profiles to form the first thermal zone at a first seating position;
flowing air from the first lower zonal duct exit to compliment the first aerodynamic profiles and direct air upward and over the first seating position; and
drawing air from the first aerodynamic profiles over the first seating position and into a return inlet; and
creating a second thermal zone in a second portion of the volume, creating the second thermal zone comprising:
providing flow communication between an HVAC unit and a second zonal duct exit and a second lower zonal duct exit spaced from the first zonal duct exit and the first lower zonal duct exit;
flowing air from the second zonal duct exit downward in second aerodynamic profiles to form the second thermal zone at a second seating position;
flowing air from the second lower zonal duct exit to compliment the second aerodynamic profiles and direct air upward and over the second seating position; and
drawing air from the second aerodynamic profiles over the second seating position and into a return inlet,
wherein the first thermal zone and the second thermal zone create a thermal zone boundary therebetween characterized by one or more of a temperature gradient or a humidity gradient across the thermal zone boundary.

T. The method of example S, wherein:
creating the first aerodynamic profiles further comprises dividing a first flow into a first upper flow and a first lower flow, the first upper flow accelerating and redirecting the first lower flow from a first direction to a second direction transverse to the first direction and into the first thermal zone; and
creating the second aerodynamic profiles further comprises dividing a second flow into a second upper flow and a second lower flow, the second upper flow of the second flow accelerating and redirecting the second lower flow of the second flow from a first lower flow direction to a second lower flow direction transverse to the first lower flow direction and into the second thermal zone.

What is claimed is:
1. A system comprising:
a duct network coupled to a first air source and configured to provide flow communication between the first air source and a cabin volume, the duct network comprising:
a first zonal duct comprising a first zonal duct exit configured to create first aerodynamic profiles resulting in a first thermal zone at a first seating position in the cabin volume and having a first temperature and a first humidity, wherein the first zonal duct is disposed above a first seat;
a first return inlet located behind the first seating position, and configured to draw air from the first aerodynamic profiles and into the first air source for recirculation, wherein the first return inlet is located below the first zonal duct, below at least a portion of a headrest associated with the first seating position, and above the first seat;
a second zonal duct comprising a second zonal duct exit configured to create second aerodynamic profiles resulting in a second thermal zone at a second seating position in the cabin volume and having a second temperature and a second humidity, an interface between the first and second thermal zones comprising a thermal boundary, wherein the second zonal duct is disposed above a second seat; and
a second return inlet located behind the second seating position, and configured to draw air from the second aerodynamic profiles and into the first air source or a second air source for recirculation, wherein the second return inlet is located below the second zonal duct, below at least a portion of a headrest associated with the second seating position, and above the second seat,
wherein one or more of:
the first temperature differs from the second temperature, or
the first humidity differs from the second humidity,
wherein the first and second thermal zones comprise contiguous portions of the cabin volume, and
wherein the first and second aerodynamic profiles are configured to minimize one or more of an amount of thermal transfer or air flow across the thermal boundary.

2. The system of claim 1, wherein the duct network further comprises:
a first comfort duct comprising a first comfort duct exit configured to provide flow communication from the first air source directed from the first comfort duct exit toward the first seating position; and
a second comfort duct comprising a second comfort duct exit configured to provide flow communication from the first air source or the second air source directed from the second comfort duct exit toward the second seating position.

3. The system of claim 2, wherein the first comfort duct exit and the second comfort duct exit each comprise turning vanes configured to direct air flow from the first comfort duct exit and the second comfort duct exit toward the first seating position and the second seating position, respectively.

4. The system of claim 1, further comprising:
a first lower zonal duct comprising a first lower zonal duct exit configured to supplement the first aerodynamic profiles resulting in the first thermal zone at the first seating position; and
a second lower zonal duct comprising a second lower zonal duct exit configured to supplement the second aerodynamic profiles resulting in the second thermal zone at the second seating position.

5. The system of claim 1, wherein the first zonal duct exit and the second zonal duct exit each comprise a chamber airfoil defining an upper flow chamber defining an upper exit and a lower flow chamber defining a lower exit, the chamber airfoil having a curved cross-section configured to direct flow from the first air source into the respective first thermal zone and second thermal zone, and wherein the upper flow chamber is configured to accelerate flow at the upper exit to direct flow from the lower flow chamber transverse to the respective first zonal duct exit and the second zonal duct exit.

6. The system of claim 1, wherein the first zonal duct exit and the second zonal duct exit each comprise a chamber airfoil defining an upper flow chamber defining an upper exit and a lower flow chamber defining a lower exit, and wherein the first zonal duct exit and the second zonal duct exit each further comprise a minor lip downstream relative to the chamber airfoil and adjacent the upper flow chamber, the minor lip accelerating flow at the upper exit of the upper flow chamber.

7. The system of claim 1, wherein the first zonal duct exit and the second zonal duct exit each comprise a chamber airfoil defining an upper flow chamber defining an upper exit and a lower flow chamber defining a lower exit, and wherein the first zonal duct exit and the second zonal duct exit each further comprise a major lip downstream relative to the chamber airfoil and adjacent the upper flow chamber.

8. The system of claim 1, wherein the first zonal duct exit and the second zonal duct exit each comprise a chamber airfoil defining an upper flow chamber defining an upper exit and a lower flow chamber defining a lower exit, and wherein the first zonal duct exit and the second zonal duct exit each further comprise a lower airfoil defining a curved airfoil profile downstream relative to the chamber airfoil and configured to redirect flow from a first direction to a second direction transverse to the first direction and into the respective first thermal zone and the second thermal zone.

9. The system of claim 1, further comprising:
a third zonal duct comprising a third zonal duct exit configured to be located above a third seating position and spaced from the first zonal duct exit and the second zonal duct exit, and configured to create third aerodynamic profiles resulting in a third thermal zone having a third temperature and a third humidity, and
a fourth zonal duct comprising a fourth zonal duct exit configured to be located above a fourth seating position and spaced from the first zonal duct exit, the second zonal duct exit, and the third zonal duct exit, and configured to create fourth aerodynamic profiles resulting in a fourth thermal zone having a fourth temperature and a fourth humidity.

10. The system of claim 9, wherein:
the first zonal duct exit and the second zonal duct exit face a first common direction, and the first zonal duct exit and the second zonal duct exit are configured to provide the first thermal zone adjacent the second thermal zone; and
the third zonal duct exit and the fourth zonal duct exit face a second common direction, and the third zonal duct exit and the fourth zonal duct exit are configured to provide the third thermal zone adjacent the fourth thermal zone.

11. A system comprising:
a duct network in flow communication with a first air source and a cabin volume, the cabin volume comprising at least two adjacent regions, the first air source configured to alter one or more of temperature or humidity, and the duct network comprising:
a first zonal duct comprising a first zonal duct exit located in the cabin volume above a first seating position and configured to create first aerodynamic profiles resulting in a first thermal zone at the first seating position having a first temperature and a first humidity, wherein the first zonal duct is disposed above a first seat;
a first return inlet located proximate to the first seating position, and configured to draw air from the first aerodynamic profiles and into the first air source for recirculation, wherein the first return inlet is located below the first zonal duct, below at least a portion of a headrest associated with the first seating position, and above the first seat;
a second zonal duct comprising a second zonal duct exit located in the cabin volume above a second seating position, spaced from the first zonal duct exit, and configured to create second aerodynamic profiles resulting in a second thermal zone at the second seating position and having a second temperature and a second humidity, wherein the second zonal duct is disposed above a second seat; and
a second return inlet located proximate to the second position, and configured to draw air from the second aerodynamic profiles and into the first air source or a second air source for recirculation, wherein the second return inlet is located below the second zonal duct, below at least a portion of a headrest associated with the second seating position, and above the second seat, wherein one or more of:
the first temperature differs from the second temperature, or
the first humidity differs from the second humidity,
wherein the first and second thermal zones are contiguous portions of the cabin volume, and
wherein the first and second aerodynamic profiles are configured to minimize one or more of an airflow or thermal flux between the first and second thermal zones.

12. The system of claim 11, wherein the first zonal duct exit and the second zonal duct exit each comprise a chamber airfoil defining an upper flow chamber defining an upper exit and a lower flow chamber defining a lower exit, the chamber airfoil having a curved cross-section configured to direct flow from the first air source into the respective first thermal zone and second thermal zone, and wherein the upper flow chamber is configured to accelerate flow at the upper exit to direct flow from the lower flow chamber transverse to the respective first zonal duct exit and the second zonal duct exit.

13. The system of claim 12, wherein the flow from the lower flow chamber is directed in a direction substantially orthogonal to a cross-section of the lower exit.

14. The system of claim 11, wherein the first zonal duct exit and the second zonal duct exit each comprise a chamber airfoil defining an upper flow chamber defining an upper exit and a lower flow chamber defining a lower exit, and wherein the first zonal duct exit and the second zonal duct exit each further comprise a lower airfoil defining a curved airfoil profile downstream relative to the chamber airfoil and configured to redirect flow from a first direction to a second direction transverse to the first direction and into the respective first thermal zone and the second thermal zone.

15. The system of claim 11, wherein:
the system is a vehicle;
the first seating position is located at a first end of the cabin volume;
the second seating position is located at a second end of the cabin volume opposite the first end of the cabin volume; and
the vehicle further comprises:
a first seat located in the first seating position and facing the second seating position; and
a second seat located in the second seating position and facing the first seating position.

16. A system comprising:
a duct network coupled to a first air source and configured to provide flow communication between the first air source and a cabin volume, the duct network comprising:
a first zonal duct comprising a first zonal duct exit configured to emit a first air flow toward a first seating position in the cabin volume, wherein the first zonal duct is disposed above a first seat;
a first return inlet configured to draw the first air flow across the first seating position and into the first air source for recirculation, wherein the first return inlet is located below the first zonal duct, below at least a portion of a headrest associated with the first seating position, and above the first seat;
a second zonal duct comprising a second zonal duct exit configured to emit a second air flow toward a second seating position in the cabin volume separate from the first seating position, wherein the second zonal duct is disposed above a second seat; and
a second return inlet configured to draw the second air flow across the second seating position and into the first air source or a second air source for recirculation, wherein the second return inlet is located below the second zonal duct, below at least a portion of a headrest associated with the second seating position, and above the second seat,
wherein the first air flow and the second air flow are in contiguous portions of the cabin volume.

17. The system of claim 16, wherein:
the system is a vehicle;
the first seating position is located at a first end of the cabin volume;
the second seating position is located at a second end of the cabin volume opposite the first end of the cabin volume; and
the vehicle further comprises:
a first seat located in the first seating position and facing the second seating position; and
a second seat located in the second seating position and facing the first seating position.

18. The system of claim 17, wherein:
the first return inlet is located behind the first headrest; and
the second return inlet is located behind the second headrest.

19. The system of claim 16, wherein there is no physical boundary between the first seating position and the second seating position.

20. The system on claim 16, wherein:
the first air flow comprises a first thermal zone associated with the first seating position;
the second air flow comprises a second thermal zone associated with the second seating position; and
the first seating position and the second seating position are disposed on the same or opposing sides of the cabin volume.

21. The system of claim 16, wherein:
the first zonal duct exit is disposed above the first seating position and is configured to emit the first air flow downward over a first occupant and into a first thermal zone;
the first zonal duct further comprising a third zonal duct exit disposed below the first seating position and configured to emit a third air flow upward from under the first occupant and into the first thermal zone;
the first return inlet is located behind the first occupant and draws the first air flow and the third air flow across the first seating position;
the second zonal duct exit is disposed above the second seating position and is configured to emit the second air flow downward over a second occupant and into a second thermal zone;
the second zonal duct further comprising a fourth zonal duct exit disposed below the second seating position and configured to emit a fourth air flow upward from under the second occupant and into the second thermal zone; and
the second return inlet is located behind the second occupant and draws a second airflow and a fourth airflow across the second seating position.

* * * * *